(12) United States Patent
Pfannkuchen et al.

(10) Patent No.: US 11,149,824 B2
(45) Date of Patent: Oct. 19, 2021

(54) ELECTRIC DRIVE FOR A MOTOR VEHICLE, IN PARTICULAR FOR AN AUTOMOBILE

(71) Applicant: DAIMLER AG, Stuttgart (DE)

(72) Inventors: Ingo Pfannkuchen, Friedrichshafen (DE); Frank Steffens, Ostfildern (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 16/971,727

(22) PCT Filed: Dec. 21, 2018

(86) PCT No.: PCT/EP2018/086521
§ 371 (c)(1),
(2) Date: Aug. 21, 2020

(87) PCT Pub. No.: WO2019/161962
PCT Pub. Date: Aug. 29, 2019

(65) Prior Publication Data
US 2020/0393021 A1 Dec. 17, 2020

(30) Foreign Application Priority Data
Feb. 23, 2018 (DE) ...................... 10 2018 001 471.2

(51) Int. Cl.
*F16H 3/54* (2006.01)
*B60K 1/00* (2006.01)

(52) U.S. Cl.
CPC .................. *F16H 3/54* (2013.01); *B60K 1/00* (2013.01); *B60K 2001/001* (2013.01);
(Continued)

(58) Field of Classification Search
CPC ......................................................... F16H 3/54
See application file for complete search history.

(56) References Cited

U.S. PATENT DOCUMENTS

| 2003/0089569 A1* | 5/2003 | Antonov ............. F16D 25/0638 192/48.92 |
| 2017/0204942 A1 | 7/2017 | Iuchi et al. |
| 2019/0105980 A1* | 4/2019 | Liu ........................ B60K 6/365 |

FOREIGN PATENT DOCUMENTS

| CN | 106931096 A | 7/2017 |
| DE | 102012220562 A1 | 5/2014 |

(Continued)

OTHER PUBLICATIONS

International Search Report dated Apr. 3, 2019 in related/corresponding International Application No. PCT/EP2018/086521.
(Continued)

*Primary Examiner* — Derek D Knight
(74) *Attorney, Agent, or Firm* — Patent Portfolio Builders PLLC

(57) ABSTRACT

An electric drive for a motor vehicle includes a housing, an output shaft, an electric engine, which has a stator and a rotor rotatable relative to the stator, a planetary gear set arranged in the housing, which has a sun gear, a ring gear and a planetary carrier, which is non-rotatably connected to the output shaft, having a first switching element, by means of which the ring gear can be non-rotatably coupled to the rotor, and a second switching element, by means of which the ring gear can be non-rotatably coupled to the housing. The first switching element and the second switching element are coupled to each other via a first coupling element and thereby can be operated together by a single first actuator common to the first switching element and the second switching element.

12 Claims, 2 Drawing Sheets

Figure 1:
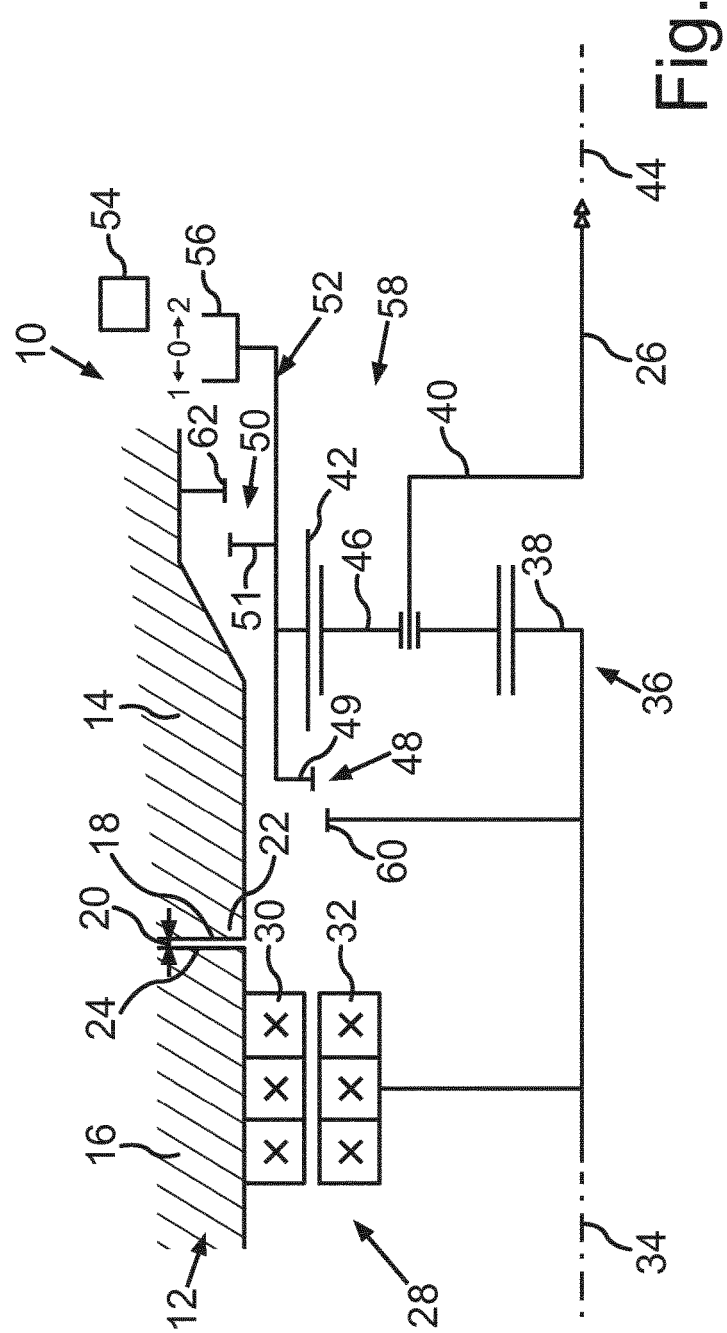

(52) U.S. Cl.
CPC ... *B60Y 2400/73* (2013.01); *F16H 2200/0021* (2013.01); *F16H 2200/2035* (2013.01)

(56) References Cited

FOREIGN PATENT DOCUMENTS

| | | |
|---|---|---|
| DE | 102014213012 A1 | 1/2016 |
| FR | 939705 A | 11/1948 |
| WO | 2015183159 A1 | 12/2015 |

OTHER PUBLICATIONS

Office Action dated Sep. 24, 2018 in related/corresponding DE Application No. 10 2018 001 471.2.
Written Opinion dated Apr. 3, 2019 in related/corresponding International Application No. PCT/EP2018/086521.

* cited by examiner

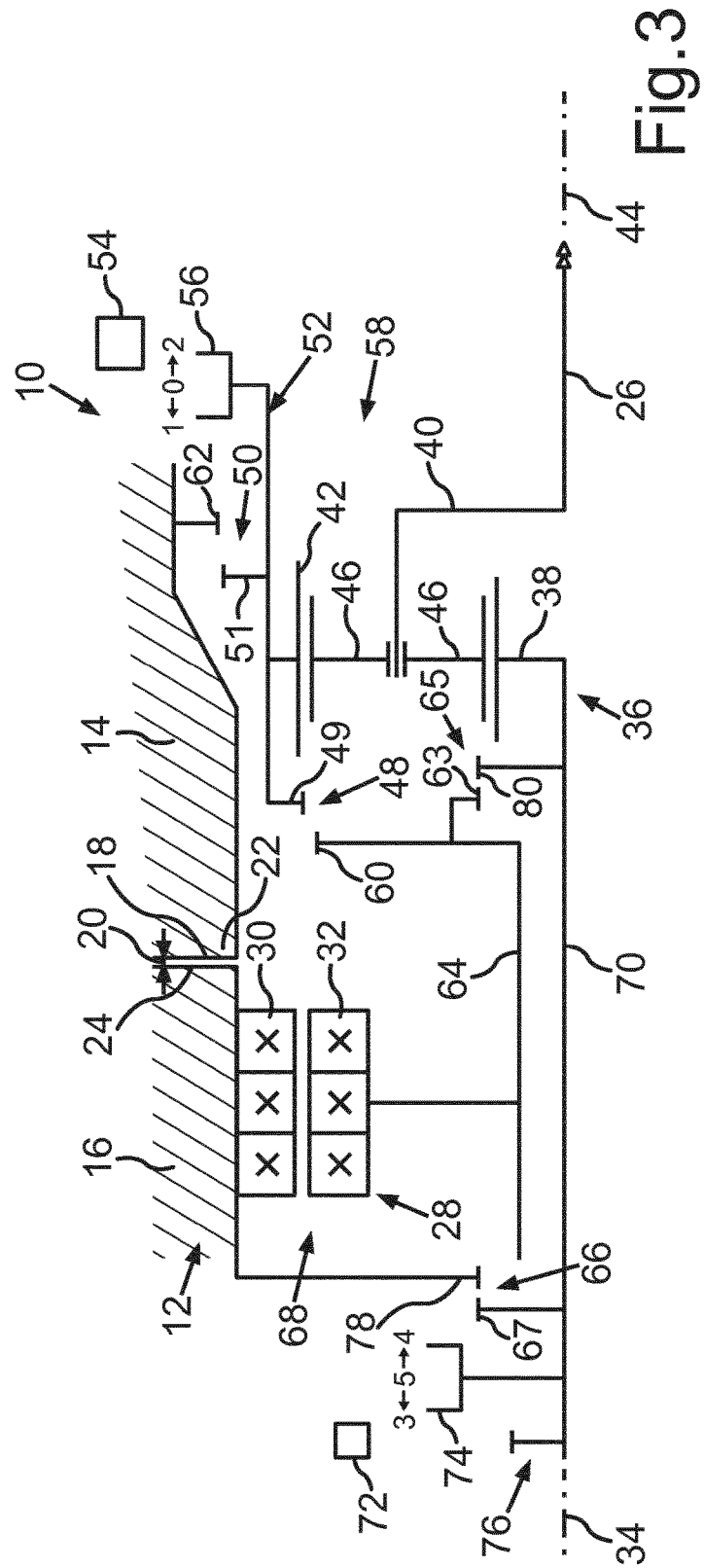

ELECTRIC DRIVE FOR A MOTOR VEHICLE, IN PARTICULAR FOR AN AUTOMOBILE

BACKGROUND AND SUMMARY OF THE INVENTION

Exemplary embodiments of the invention relate to an electric drive for a motor vehicle, in particular for an automobile.

Such an electric drive for a motor vehicle, for an automobile, is already known from DE 10 2012 220 562 A1, for example. The electric drive has a housing and an output shaft via which, for example, the electric drive can provide torques for driving at least one wheel or several wheels of the motor vehicle. In this way, for example, the motor vehicle can be driven by the electric drive via the output shaft. The electric drive also comprises an electric engine having a stator and a rotor, which can be rotated relative to the stator. The rotor can be driven by the stator and is thus rotatable relative to the stator. In addition, the electric drive comprises a planetary gear set arranged in the housing, which has a sun gear, a ring gear and a planetary carrier. The planetary carrier is non-rotatably connected to the output shaft. Moreover, the electric drive has a first switching element, by means of which the ring gear can be non-rotatably coupled or connected to the rotor. In addition, a second switching element is provided, by means of which the ring gear can be non-rotatably coupled or connected to the housing.

Such electric drive trains are also known from DE 10 2014 213 012 A1 and CN 106 931 096 A.

US 2003/0 089 569 A1 discloses a transmission suitable for an electric drive train is known, in which a planetary gear set having four switching elements is provided.

Exemplary embodiments of the present invention are directed to an electric drive of the type mentioned above in which the number of parts, the weight, the costs and the installation space requirement of the electric drive can be kept within a particularly small range.

In order to provide an electric drive in such a way that the number of parts, the weight, the installation space required and the costs of the electric drive can be kept in a particularly small range, it is first assumed that the first switching element and the second switching element are coupled to each other via a first coupling element and can thus be operated, i.e., switched, via the coupling element common to the first switching element and the second switching element or at the same time by means of a single first actuator common to the first switching element and the second switching element. In this way, respective, separate or individual actuators for operating the first switching element and the second switching element can be avoided, such that the first actuator suffices or is used as the only actuator in order to operate the first switching element and the second switching element together.

In the context of the invention, a non-rotatable connection of two rotatably mounted elements means that the two elements are arranged coaxially to each other and are connected to each other in such a way that they rotate at the same angular velocity. With a non-rotatable connection of a rotatably mounted element to a housing part, it is intended that the element be connected to the housing in such a way that it cannot be rotated relative to the housing.

By the feature that the planetary carrier is non-rotatably connected to the output shaft, it is in particular to be understood that the planetary carrier is permanently non-rotatably coupled to the output shaft. The planetary carrier, the sun gear, and the ring gear are components of the planetary gear set, wherein the sun gear, the planetary carrier, the ring gear and the housing are components of the electric drive or are also referred to as components. The respective component can be rotated relative to the housing around an axis of rotation, also referred to as the main axis of rotation, in particular if the respective component is not coupled or connected to the housing in a rotationally fixed manner, i.e., is not non-rotatably fixed to the housing. Furthermore, for example, two of the respective components can rotate relative to each other around the main axis of rotation, in particular if the two respective components are not non-rotatably connected to each other. In the context of the invention, by a permanent non-rotatable connection or coupling of at least two of the respective components, for example the planetary carrier and the output shaft in the present case, it is to be understood that the two components permanently non-rotatably connected to each other are constantly or always and thus permanently non-rotatably connected to each other in such a way that the components in particular also cannot rotate relative to each other when the planetary gear set is driven, i.e., when torques are introduced into the planetary gear set, and such that not approximately one switching element is provided by means of which the non-rotatable connection between the two respective components can be alternatively made and released or disengaged, but rather the permanent non-rotatable connection between the two respective components is permanent, i.e., is constantly or always provided.

In contrast, the first switching element, for example, can be changed over between a first connection state and a first release state. The first connection state corresponds, for example, to at least one first connection position, wherein the first release state corresponds, for example, to at least one first release position. Here, the first switching element can be moved, for example, in particular relative to the housing and/or in a translational manner, between the first connection position and the first release position. In the first connection state, the ring gear is coupled non-rotatably to the rotor by means of the first switching element, such that the ring gear cannot rotate relative to the rotor, in particular even when the planetary gear set is driven. In the first release state, however, the first switching element releases the ring gear for a rotation relative to the rotor, in particular around the main axis of rotation, such that, for example, the ring gear can rotate relative to the rotor, in particular around the main axis of rotation, in particular when the planetary gear set is driven.

By way of example, the rotor can rotate relative to the stator around a machine axis of rotation. Here, it is preferably provided that the machine axis of rotation runs in parallel to the main axis of rotation or coincides with the main axis of rotation. The electric engine can be operated in an engine operation in which the rotor is driven by the stator and thus rotated around the machine axis of rotation. In the engine operation, the electric engine provides torque via the rotor, which is also referred to as drive torque or output torque. The respective drive torque provided by the electric engine via the rotor can, for example, be introduced into the planetary gear set, thereby driving the planetary gear set. Since, for example, in the first connection state, the rotor is non-rotatably connected or coupled to the ring gear by means of the first switching element, the respective drive torque in the first connection state is introduced into the planetary gear set, for example via the ring gear, such that, for example, the ring gear is the first component, relative to the components of the planetary gear set, to which the respective drive torque is transmitted.

The second switching element can be switched, for example, between a second connection state and a second release state. The second connection state corresponds, for example, to at least one second connection position, wherein the second release state corresponds, for example, to at least one second release position. Here, the second switching element can be moved, for example, between the second connection position and the second release position, for example, in particular relative to the housing and/or translationally. In the second connection state, the ring gear is non-rotatably coupled or connected to the housing by means of the second switching element and is thus non-rotatably fixed to the housing. Thus, the ring gear cannot, in particular, rotate relative to the housing, in particular around the main axis of rotation, even when the planetary gear set is driven. In the second release state, however, the second switching element releases the ring gear for a rotation relative to the housing, in particular around the main axis of rotation, such that the ring gear can, in particular, rotate relative to the housing, in particular around the main axis of rotation, even when the planetary gear set is driven. The first switching element or the second switching element can be changed over, in particular moved, between the respective release state and the respective connection state by actuating the first switching element or the second switching element. Since, in accordance with the invention, the first switching element and the second switching element are coupled to each other by means of the first coupling element and are thus connected to each other, the first switching element and the second switching element can be operated by means of the first coupling element common to the first switching element and the second switching element by means of the exactly first actuator and can thus be switched or changed over. In this way, a particularly advantageous switchability of the electric drive can be implemented in a space-saving, weight-saving and cost-effective manner, such that a multiple-mobility, i.e., at least a double-mobility, of the electric drive can be represented. In other words, it is possible to implement at least two switchable, in particular load-switchable, gears of the electric drive in a particularly simple, cost-, weight- and space-efficient manner, such that a particularly efficient operation can be implemented. It has proved to be advantageous if the planetary gear set is the only planetary gear set of the electric drive, such that the electric drive has exactly or exclusively one planetary gear set in the form of the planetary gear set described above.

Furthermore, it is assumed that the electric drive has a third switching element, by means of which the sun gear can be non-rotatably coupled or connected to the rotor. The third switching element can thus be changed over, for example, between a third connection state and a third release state. The third connection state corresponds, for example, to at least one third connection position, wherein the third release state corresponds to at least one third release position, for example. In this way, the third switching element can be moved between the third connection position and the third release position translationally and/or relative to the housing. In the third connection state, the sun gear is non-rotatably coupled to the rotor by means of the third switching element, such that the sun gear cannot rotate relative to the rotor, in particular around the main axis of rotation, even when the planetary gear set is driven. In the third release state, however, the third switching element, for example, releases the sun gear for a rotation relative to the rotor, in particular around the main axis of rotation, such that the sun gear rotates or can rotate relative to the rotor, in particular around the main axis of rotation, when the planetary gear set is driven. Since, in the third connection state, the sun gear is non-rotatably coupled to the rotor by means of the third switching element, the respective drive torque is introduced, for example, via the sun gear with the planetary gear set, such that the sun gear is then, for example, the first component relative to the components of the planetary gear set, to which the respective drive torque is transmitted.

Furthermore, a fourth switching element is taken as a starting point, by means of which the sun gear can be non-rotatably coupled to the housing. This means that the sun gear can be non-rotatably fixed to the housing by means of the fourth switching element. The fourth switching element can be changed over between a fourth connection state and a fourth release state, for example. The fourth connection state corresponds, for example, to at least one fourth connection position, wherein the fourth release state corresponds, for example, to at least one fourth release position. In this way, for example, the fourth switching element can be moved between the fourth connection position and the fourth release position, in particular translationally and/or relative to the housing. In the fourth connection state, the sun gear is non-rotatably coupled to the housing by means of the fourth switching element, such that the sun gear, in particular, does not or cannot rotate relative to the housing, in particular around the main axis of rotation, even when the planetary gear set is driven. In the fourth release state, however, the fourth switching element releases the sun gear for a rotation relative to the housing, in particular around the main axis of rotation, such that the sun gear rotates or can rotate relative to the housing, in particular around the main axis of rotation, when the planetary gear set is driven.

According to the invention, the fourth switching element is arranged on a side of the electric engine facing away from the planetary gear set in the axial direction of the electric engine. In this way, the installation space requirement can be kept particularly low. It has also proved to be particularly advantageous if the fourth switching element is arranged on a side of the third switching element facing away from the planetary gear set in the axial direction of the planetary gear set. This allows a particularly small installation requirement to be represented.

In an advantageous design of the invention, the first coupling element comprises the ring gear of the planetary gear set, wherein the ring gear of the planetary gear set is designed as a displacement ring gear displaceable in the axial direction of the planetary gear set relative to the housing. The axial direction of the planetary gear set coincides with the main axis of rotation, such that the displacement ring gear is, for example, displaceable along the main axis of rotation relative to the housing and in particular relative to the sun gear and/or the planetary carrier, i.e., is translationally moveable. In the process, the displacement ring gear can be or is displaced in the axial direction of the planetary gear set relative to the housing for the common or simultaneous actuation or switching of the first switching element and the second switching element. By way of example, the first switching element is coupled to the second switching element via the displacement ring gear, such that the displacement ring gear can be or is displaced in the axial direction of the planetary gear set relative to the housing for the common or simultaneous actuation or switching of the first switching element and the second switching element. By using the ring gear as a coupling device for coupling or connecting the first switching element and the second switching element to one another, the number of parts and the installation space requirement of the electric drive can be kept particularly low. Since the first switching element and the second switching element can be actuated by axial displacement of the displacement ring gear, not only the changing over of the first switching element takes place together with the changing over of the second switching element, but the respective changing over of the first switching element and the second switching element is simultaneously accompanied by an axial displacement of the displacement ring gear relative to the housing.

A further embodiment is characterized in that the first coupling element is connected to the first actuator, also referred to as the first actuation device, via a first connecting element arranged in the axial direction of the planetary gear set on a side of the planetary gear set facing away from the electric engine. Since, for example, the machine axis of rotation runs in parallel to the main axis of rotation or coincides with it, the axial direction of the planetary gear set coincides with the axial direction of the electric engine. Due to the described arrangement of the connecting element, the installation space requirement of the electric drive can be kept particularly low.

Due to the fact that the first coupling element is connected to the first actuator via the first connecting element, the first coupling element, in particular the displacement ring gear, can be actuated by the first actuator via the connecting element and can thereby be displaced relative to the housing, in particular in the axial direction of the planetary gear set, in order to thereby cause an actuation and thus a changeover of the first switching element and the second switching element.

By using the third switching element, a particularly advantageous multiple-mobility of the electric drive can be implemented. This embodiment enables a particularly advantageous electrification of existing vehicle series via an electric central engine with conventional axles, wherein, for example, the electric drive according to the invention is used as the aforementioned electric central engine. In principle, it is conceivable to use transmissions with a maximum of two gears for such an electrification. However, in order to operate the electric engine in its efficient range for longer periods, more than two gears are required. A first of the gears can be used, for example, as a starting gear and thus for starting the motor vehicle. Furthermore, the first gear can be used for stop-and-go operation. A second of the gears can be used, for example, for a city and country road operation, in which the motor vehicle is driven at speeds in the range of from 40 kilometers per hour to 60 kilometers per hour and is driven here by means of the electric drive. A third of the gears can be used as a direct gear to implement a cruising speed, for example, to drive the motor vehicle particularly efficiently in a speed range of from 80 to 89 kilometers per hour. Usually, several planetary gear sets are necessary to implement at least or exactly three gears. However, this can now be avoided with the electric drive according to the invention.

In order to be able to keep the installation space requirement of the electric drive particularly low, it is provided in a further embodiment of the invention that the electric drive has a second coupling element designed as a hollow shaft, via which or by means of which the third switching element is coupled or connected to the rotor, in particularly non-rotatably. Preferably, the third switching element is permanently non-rotatably coupled or connected to the rotor via the second coupling element, i.e., via the hollow shaft.

By using the fourth switching element and the possibility implemented in this way of fixing the sun gear, i.e., non-rotatably connecting it to the housing, the previously described exactly three gears of the electric drive can be implemented with only one planetary gear set in the form of the planetary gear set described above. In other words, in comparison with conventional three-gear transmissions, where several planetary gear sets are necessary to implement three gears, the three gears can be implemented by means of a single planetary gear set by fixing the sun gear. If, for example, the sun gear, also referred to as sun, is driving, the planetary carrier, also referred to as the crosspiece, is driven and the ring gear is fixed, i.e., non-rotatably connected, to the housing, then a transmission ratio or reduction ratio of the planetary gear set of i=3.8 can be implemented. The feature that the sun is driving is to be understood to mean that the respective driving torque is introduced into the planetary gear set via the sun gear, wherein the driven crosspiece is driven by the electric engine via the sun gear, while the ring gear is non-rotatably connected to the housing. The same planetary gear set can also be used with a transmission ratio of i=1.35, in particular when the crosspiece is driven, the ring gear is driving and the sun is fixed. This means that the respective drive torque is introduced into the planetary gear set via the planetary carrier, wherein the ring gear is driven by the electric engine via the planetary carrier, while the sun gear is non-rotatably connected to the housing. Thus, for example, in a first of the gears, the sun is driving, the crosspiece is driven and the ring gear is fixed, wherein in the second of the gears, for example, the sun is fixed, the crosspiece is driven and the ring gear is driving. A third of the gears can be represented, for example, by means of interlocking, in that at least or exactly two of the components of the planetary gear set are interlocked with each other and are thus non-rotatably connected to each other. In this way, a particularly high number of switchable gears can be implemented in a space-saving, weight-saving and cost-effective manner.

In order to be able to implement a particularly simple construction and thus particularly low costs of the electric drive, it is provided in a further embodiment of the invention that the electric drive has a third coupling element designed as a solid shaft, via which the fourth switching element is coupled to the sun gear. In particular, the fourth switching element is permanently non-rotatably connected to the sun gear via the third coupling element. Here, the third coupling element is at least partially, in particular at least predominantly or completely, arranged within the second coupling element. This means that the third coupling element is at least partially, in particular at least predominantly or completely, covered by the second coupling element, in particular by the hollow shaft, in the radial direction of the planetary gear set or the electric engine towards the outside.

In order to be able to keep the installation space requirement, the number of parts, the weight and the costs of the electric drive particularly low, a further embodiment of the invention, the fourth switching element and the third switching element are coupled to each other via the third coupling element. As a result, the third switching element and the fourth switching element can be operated together or simultaneously by means of a single second actuator common to the third switching element and the fourth switching element via the third coupling element common to the third switching element and the fourth switching element. In other words, the third switching element and the fourth switching element can be simultaneously switched and thus changed over via the third coupling element by means of the third actuator, also referred to as third actuating device, such that respective, separate or individual actuators for operating the third switching element and the fourth switching element can be avoided.

It has proved to be particularly advantageous in this respect if the electric drive has a second connecting element for connecting the third coupling element to the second actuator. This means that the third coupling element and via this the third switching element and the fourth switching element can be operated via the second connecting element by means of the second actuator. The second connecting element is arranged in the axial direction of the electric engine on a side of the electric engine facing away from the planetary gear set, whereby the installation space requirement can be kept within a particularly small framework.

In a further, particularly advantageous design of the invention, the second connecting element is arranged in the axial direction of the electric engine on a side of the fourth switching element facing away from the electric engine, whereby a particularly compact design can be implemented.

A further embodiment is characterized by a fifth switching element for non-rotatably coupling or connecting a power take-off shaft to the sun gear. The fifth switching element can be changed over between a fifth connection state and a fifth release state, for example. The fifth connection state corresponds, for example, to at least one fifth connection position, wherein the fifth release state corresponds, for example, to at least one fifth release position. Here, for example, the fifth switching element can be moved between the fifth connection position and the fifth release position, in particular relative to the housing and/or translationally. In the fifth connection position, the sun gear is non-rotatably coupled to the power take-off shaft by means of the fifth switching element, such that the power take-off shaft is driven by the sun gear. At least one power take-off can be implemented via the power take-off shaft, for example, in order to drive at least one auxiliary unit. In the fifth release state, the power take-off shaft is decoupled from the sun gear, such that no torque can be transmitted between the power take-off shaft and the sun gear via the fifth switching element.

In order to implement a particularly compact design, it has proved to be particularly advantageous if the fifth switching element is arranged in the axial direction of the electric engine on a side of the fourth switching element facing away from the electric engine.

It has proved to be particularly advantageous if the fifth switching element is coupled or connected to the fourth switching element and to the third switching element, such that, for example, the third switching element, the fourth switching element and the fifth switching element can be operated together or simultaneously and thus changed over, in particular via the second connecting element by means of the second actuator.

In order to keep the installation space requirement particularly low, it can be provided that the fifth switching element is arranged in the axial direction of the electric engine or the planetary gear set before the second connecting element, such that, for example, the second connecting element is arranged in the axial direction between the fifth switching element and the fourth switching element or the third switching element.

It has also proved to be advantageous if the second switching element is arranged in the radial direction outside the rotor and in the axial direction on a side of the planetary gear set facing away from the electric engine.

A further embodiment is characterized by the fact that the first switching element is arranged in the radial direction at the same height as the rotor or outside the rotor. The arrangement of the second switching element or the first switching element in the radial direction outside the rotor is to be understood to mean in particular that the second switching element or the first switching element is arranged further outwards than the rotor in the radial direction.

A further embodiment is characterized by the fact that the first switching element is arranged in the axial direction between the electric engine and the planetary gear set.

The housing can be formed in one piece. Alternatively, it is conceivable that the housing has at least or exactly two separately formed housing parts connected to each other. In this case, the housing delimits a receiving space in which the planetary gear set is received. Preferably, the electric engine is also arranged in the housing, in particular in the receiving space. By way of example, the housing parts are supported on one another or connected to one another via respective flanges along a parting plane, wherein the flanges are supported on one another in or along the parting plane, for example, in particular in the axial direction of the planetary gear set or of the electric engine and thus of the electric drive as a whole. In particular, it is conceivable that the parting plane is arranged in the axial direction between the planetary gear set and the electric engine, wherein the parting plane preferably runs perpendicularly to the axial direction. Alternatively or additionally, it is conceivable that the planetary gear set is arranged in a first of the housing parts, such that the planetary gear set is, for example, at least partially, in particular at least predominantly or completely covered by the first housing part in the radial direction outwards. In this case, for example, the electric engine is arranged in the second housing part, such that, for example, the electric engine is covered at least partially, in particular at least predominantly or completely, by the second housing part in the radial direction towards the outside.

Further advantages, features and details of the invention arise from the following description of preferred exemplary embodiments and from the drawing. The features and combinations of features mentioned above in the description as well as the features and combinations of features mentioned below in the figure description and/or shown in the figures alone can be used not only in the combination specified in each case, but also in other combinations or on their own without leaving the scope of the invention.

BRIEF DESCRIPTION OF THE DRAWING FIGURES

Figure 2:
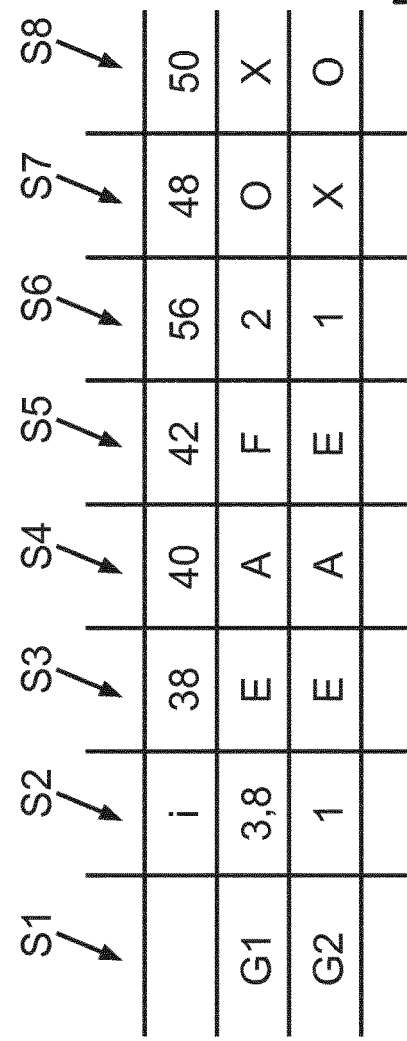

The drawing shows in:

FIG. 1 in sections, a schematic depiction of an electric drive in accordance with the invention according to a first embodiment, FIG. 2 a switching table of the electric drive according to the first embodiment, FIG. 3 in sections, a schematic depiction of the electric drive according to a second embodiment, and FIG. 4 a switching table of the electric drive according to the second embodiment.

In the figures, identical or functionally identical elements are provided with identical reference numerals.

DETAILED DESCRIPTION

FIG. 1 shows a schematic depiction of an electric drive 10 for a motor vehicle. Preferably, the motor vehicle is designed as an electric vehicle and can be electrically driven by means of the electric drive 10. The electric drive 10 has a housing 12, which has two separately designed and interconnected housing parts 14 and 16. The housing parts 14 and 16 are supported on and connected to each other in or along a parting plane 18 at least indirectly, in particular directly, wherein the parting plane 18 runs at least substantially perpendicularly to the axial direction of the electric drive 10. By way of example, FIG. 1 shows a connecting element 20, for example designed in the form of a screw, by means of which the housing parts 14 and 16 are connected to one another. In particular, the housing parts 14 and 16 are screwed together. Here, the housing parts 14 and 16 have respective flanges 22 and 24, via which the housing parts 14 and 16 are connected to each other, in particular along or in the parting plane 18. The flanges 22 and 24 are at least indirectly, in particular directly, supported on each other in the parting plane, in particular in the axial direction of the electric drive 10. In other words, the housing parts 14 and 16 are at least indirectly, in particular directly, supported on each other in the parting plane 18 in the axial direction of the electric drive 10.

The electric drive 10 has an output shaft 26, via which the electric drive 10 can provide torques to drive at least one or more gears of the motor vehicle. The motor vehicle can thus be driven via the output shaft 26 by means of the electric drive 10.

The electric drive 10 has an electric engine 28, which is arranged in the housing 12 and has a stator 30 and a rotor 32. The rotor 32 can be rotated around a machine axis of rotation 34 relative to the stator 30 and relative to the housing 12, wherein the stator 30 is non-rotatably fixed to the housing 12. In particular, the rotor 32 can be driven by the stator 30 and can thus be rotated around the machine axis of rotation 34. By way of example, in an engine operation of the electric engine 28, the stator 30 drives the rotor 32, whereby the rotor 32 is rotated around the machine axis of rotation 34 relative to the stator 30. In this way, the electric engine 28 provides torques via the rotor 32, which are also referred to as drive torques or output torques.

In addition, the electric drive 10 has exactly one planetary gear set 36, which is also referred to as a planetary set and is arranged in the housing 12. It can be seen from FIG. 1 that the electric engine 28 is arranged in the housing part 16 and is thus completely covered by the housing part 16 in the radial direction of the electric drive 10 towards the outside. The radial direction of the electric drive 10 runs perpendicularly to the axial direction, which coincides with the machine axis of rotation 34. Thus, the radial direction runs perpendicularly to the machine axis of rotation 34. In contrast, the planetary gear set 36 is arranged in the housing part 14 and is completely covered by the housing part 14 in the radial direction of the planetary gear set 36 towards the outside. The radial direction of the planetary gear set 36 runs perpendicularly to its axial direction, which coincides with the axial direction of the electric engine 28.

The planetary gear set 36 comprises a sun gear 38, which is simply referred to as sun. In addition, the planetary gear set 36 has a planetary carrier 40, which is also referred to as a crosspiece. Moreover, the planetary gear set 36 comprises a ring gear 42. The sun gear 38, the planetary carrier 40, and the ring gear 42 are components of the planetary gear set 36, wherein the respective component can be rotated around a main axis of rotation 44 of the planetary gear set 36 relative to the housing 12, in particular if it is not non-rotatably fixed to the housing 12. It can be seen from FIG. 1 that the main axis of rotation 44 coincides with the machine axis of rotation 34, such that the machine axis of rotation 34 and the main axis of rotation 44 coincide as a whole with an axis of rotation of the electric drive 10. The axis of rotation and thus the machine axis of rotation 34 and the main axis of rotation 44 run in the axial direction of the electric drive 10 and thus perpendicularly to the respective radial direction. Thus, for example, the parting plane 18 runs perpendicularly to the mentioned axis of rotation.

Furthermore, the planetary gear set 36 comprises at least one or more planetary gears 46, wherein the respective planetary gear 46 is rotatably mounted on the crosspiece, meshes with the ring gear 42 on one side and meshes with the sun gear 38 on the other side. The output shaft 26 is permanently connected to the planetary carrier 40, such that the crosspiece represents an output element or an output of the planetary gear set 36. This means that the crosspiece is the last component, in relation to a torque flow from the rotor 32 to the output shaft 26 and in relation to the components of the planetary gear set 36, from which last component the respective drive torque is transmitted to the output shaft 26. Overall, it can be seen that the respective drive torque provided by the electric engine 28 via the rotor 32 is introduced into the planetary gear set 36 and transmitted via the planetary gear set 36 to the output shaft 26 and provided by the electric drive 10 via the output shaft 26. The motor vehicle can thus be driven by the rotor 32 via the output shaft 26 and the planetary gear set 36, wherein the planetary gear set 36 is arranged between the rotor 32 and the output shaft 26 in relation to the torque flow from the rotor 32 to the output shaft 26.

The electric drive 10 has a first switching element 48, by means of which the ring gear 42 can be non-rotatably coupled or connected to the rotor 32. In addition, the electric drive 10 comprises a second switching element 50, by means of which the ring gear 42 can be non-rotatably connected to the housing 12. By means of the switching elements 48 and 50, the ring gear 42 can either be non-rotatably connected to the rotor 32 or non-rotatably connected to the housing 12.

In order to keep the number of parts and thus the costs, the installation space requirement and the weight of the electric drive 10 particularly low, the switching elements 48 and 50 are coupled to each other via a first coupling element 52, whereby the switching elements 48 and 50 can be actuated, i.e., changed over, via the coupling element 52 common to the switching elements 48 and 50 by means of exactly one and thus by means of a single first actuator common to the switching elements 48 and 50. The first actuator can be a component of the electric drive 10 and is only depicted very schematically in FIG. 1 and is designated 54. Here, the first coupling element 52 comprises the ring gear 42, which is designed as a displacement ring gear. This means that the ring gear 42 can be displaced in the axial direction of the planetary gear set 36 or the electric drive 10 as a whole relative to the housing 12.

Since the coupling element 52 comprises the ring gear 42 as the aforementioned displacement ring gear, the displacement ring gear can be displaced in the axial direction relative to the housing 12 in order to actuate the switching elements 48 and 50 together or simultaneously. In other words, in order to actuate the switching elements 48 and 50, i.e., to change over, the first coupling element 52 and thus the ring gear 42 are displaced in the axial direction relative the housing 12. The electric drive 10 comprises a first connecting element 56, which is connected to the first coupling element 52. The first coupling element 52 is thus connected to the first actuator 54 via the connecting element 56, such that the coupling element 52 and via this the switching elements 48 and 50 can be operated and thus switched via the connecting element 56 by means of the actuator 54. At least respective switching parts 49 and 51 of the switching elements 48 and 50 can be displaced in the axial direction relative to the housing 12 via the connecting element 56 by means of the actuator 54, whereby the switching elements 48 and 50 can be changed over. Thus, the connecting element 56 is arranged in the axial direction of the planetary gear set 36 on a side 58 of the planetary gear set 36 facing away from the electric engine 28.

It can be seen from FIG. 1 that the connecting element 56 and thus the coupling element 52, the switching part 51 of the second switching element 50, the switching part 49 of the first switching element 48 and the ring gear 42 can be displaced in the axial direction relative to the housing 12 by means of the actuator 54 between a first coupling position designated 1, a second coupling position designated 2 and a first decoupling position designated 0. The first decoupling position 0 is illustrated in FIG. 1. The ring gear 42 meshes with the corresponding planetary gear 46 in the first coupling position, as well as in the second coupling position and in the first decoupling position. In the first decoupling position, the switching parts 49 and 51 are decoupled from corresponding switching parts 60 and 62 of the switching elements 48 and 50, wherein the switching part 60 of the switching element 48 is permanently non-rotatably connected to the rotor 32. The switching part 62 of the switching element 50 is permanently non-rotatably connected to the housing 12.

FIG. 1 shows a first embodiment, in which the sun gear 38 is permanently non-rotatably connected to the rotor 32. The switching elements 48 and 50, for example, are permanently non-rotatably connected to the ring gear 42. In the first coupling position 1, the switching part 51 is decoupled from the corresponding switching part 62, and the switching part 49 is coupled to the corresponding switching part 60, such that the ring gear 42 is non-rotatably connected to the rotor 32 by means of the switching element 48. In this way, for example, the ring gear 42 can rotate around the main axis of rotation 44 relative to the housing 12, in particular when the planetary gear set 36 is driven. In the second coupling position, however, the switching part 49 is decoupled from the corresponding switching part 60, and the switching part 51 is coupled to the corresponding switching part 62, such that the ring gear 42 is non-rotatably fixed to the housing 12 by means of the switch element 50. This means that there is no relative rotation around the main axis of rotation 44 between the ring gear 42 and the housing 12, wherein, for example, the rotor 32 rotates or can rotate around the main axis of rotation 44 or around the machine axis of rotation 34 relative to the ring gear 42, in particular when the planetary gear set 36 is driven.

Since the sun gear 38 is non-rotatably connected to the rotor 32, and since the switching part 60 is permanently non-rotatably connected to the rotor 32, the switching part 60 is permanently non-rotatably connected to the sun gear 38. Thus, in the first coupling position, the ring gear 42 is non-rotatably connected to the sun gear 38 by means of the switching element 48, and thus interlocked with the sun gear 38, such that, for example, when the planetary gear set 36 is driven by means of the electric engine 28 via the rotor 32, the ring gear 42 and the sun gear 38 circulate together and thus as a block around the main axis of rotation 44 and thus rotate relative to the housing 12. In the second coupling position and in the decoupling position, the interlocking of the ring gear 42 with the sun gear 38 is reversed. In the first embodiment, the electric drive 10 has at least or exactly two gears, which are switchable, in particular load-switchable.

FIG. 2 shows a switching table of the electric drive 10 according to the first embodiment. The switchable gears of the electric drive 10 according to the first embodiment are entered into a column S1 of the switching table, wherein a first of the gears is designated G1 and a second of the gears is designated G2. Respective transmission ratios of the gears G1 and G2, designated i, are entered into a column S2 of the switching table. It can be seen from FIG. 2 that the transmission ratio of the first gear G1 is 3.8, wherein the transmission ratio of the second gear G2 is 1. In the first decoupling position, the gears G1 and G2 are designed such that, for example, the output shaft 26 cannot be driven in a defined manner by the rotor 32. While the first gear G1 is engaged, the second gear G2 is disengaged. Consequently, the first gear G1 is disengaged while the second gear G2 is engaged. In order to engage the first gear G1, the second coupling position is adjusted. In order to engage the second gear G2, the first coupling position is adjusted. If the first gear G1 is engaged, the respective drive torque provided by the electric engine 28 and the rotor 32 is converted by the transmission ratio of the first gear G1. If the second gear G2 is engaged, there is no conversion of the respective drive torque, since the transmission ratio of the second gear G2 is 1.

The respective force flows are entered into the columns S3, S4 and S5 of the switching table. As can be seen from column S3, the sun gear 38 is an inlet, designated E, of the planetary gear set 36, both when the first gear G1 is engaged and when the second gear G2 is engaged, since the respective drive torque is introduced into the planetary gear set 36 via the sun gear 38. As can be seen from column S4, both when the first gear G1 is engaged and when the second gear G2 is engaged, the planetary carrier 40 is an outlet, designated A, of the planetary gear set 36, since the electric drive 10 in each case transmits the respective torque for driving the motor vehicle via the planetary carrier 40 to the output shaft 26 and provides it via this output shaft. The outlet A is also referred to as output, since the drive provides the respective torque to drive the motor vehicle via the output. It can be seen from column S5 that when the first G1 is engaged, the ring gear 42 is non-rotatably connected to the housing 12. The ring gear 42 is thus fixed, which is designated F in FIG. 2. However, if the second gear G2 is engaged, the ring gear 42 is also an inlet of the planetary gear set 36, since the respective drive torque is introduced into the planetary gear set 36 both via the sun gear 38 and via the ring gear 42, which is non-rotatably connected to the sun gear 38.

Furthermore, the columns S6, S7 and S8 illustrate the respective switching positions or switching states of the connecting element 56, the switching element 48 and the switching element 50. As already described above, the connecting element 56 is in the second coupling position 2 in order to thereby engage the first gear C1. Furthermore, the connecting element 56 is in the first coupling position 1 in order to thereby engage the second gear G2. If the first gear G1 is engaged, the switching element 48 is in its release state, which is designated 0 in FIG. 2. Furthermore, the switching element 50 is in its connection state, which is designated x in FIG. 2. In other words, when the first gear G1 is engaged, the switching element 48 is opened, while the switching element 50 is closed. If the second gear G2 is engaged, the switching element 48 is closed and the switching element 50 is open or opened. In other words, when the second gear G2 is engaged, the switching element 48 is in its connection state while the switching element 50 is in its released state.

FIG. 3 shows a second embodiment in which the electric drive 10 has at least or exactly three gears C1, G2 and G3.

FIG. 4 shows a switching table of the electric drive 10 according to FIG. 3, wherein the second gear G2 has a transmission ratio of 1.35. The third gear G3 has a transmission ratio of 1. In the second embodiment, the electric drive 10 comprises a third switching element 65, by means of which the sun gear 38 can be non-rotatably connected to the rotor 32. A second coupling element 64, designed as a hollow shaft, is provided, by means of which the third switching element 65, in particular a switching part 63 of the switching element 65, is permanently non-rotatably coupled to the rotor 32. In addition, a fourth switching element 66 is provided, by means of which the sun gear 38 can be non-rotatably coupled to the housing 12. The fourth switching element 66 is arranged on a side 68 of the electric engine 28 facing away from the planetary gear set 36, in the axial direction of the electric engine 28 or the electric drive 10 as a whole. In addition, the fourth switching element 66 is arranged on a side of the third switching element 65 facing away from the planetary gear set 36 in the axial direction of the planetary gear set 36 or of the electric drive 10 as a whole. The hollow shaft, for example, is a shaft of the electric engine 28, in particular of the rotor 32. In other words, the hollow shaft is permanently non-rotatably coupled to the rotor 32.

Furthermore, the electric drive 10 according to the second embodiment comprises a third coupling element 70 designed as a solid shaft, wherein the solid shaft is designed as a torsion shaft, for example, or is also referred to as a torsion shaft. Via the third coupling element 70, the fourth switching element 66, in particular a switching part of the 67 of the switching element 66, is permanently non-rotatably coupled to the sun gear 38, wherein in the present case, the third coupling element 70 is arranged radially inside and at least partially axially inside the second coupling element 64 or the hollow shaft. In the present case, the solid shaft penetrates the hollow shaft. Again expressed in other words, the hollow shaft is arranged on the solid shaft or the coupling element 64 is arranged on the coupling element 70. In this way, the fourth switching element 66 and the third switching element 65, in particular the switching part 67 of the switching element 66 and a switching part 80 of the switching element 65, are permanently non-rotatably coupled to each other via the third coupling element 70 and can thus be jointly operated by means of a single second actuator common to the switching elements 65 and 66.

The third coupling element 70, the switching part 67 of the switching element 66 and the switching part 80 of the switching element 65 are non-rotatably and axially fixed to one another and can be displaced together axially by means of the second connecting element 74.

The sun gear 38 is particularly advantageously designed, as depicted in FIG. 3, as a displacement sun gear and is axially fixed and non-rotatably connected to the third coupling element 70 and can be displaced axially together with the coupling element 70.

The second actuator is depicted particularly schematically in FIG. 3 and is designated 72. Here, the electric drive 10 comprises a second connecting element 74 for connecting the third coupling element 70 to the second actuator 72. In other words, the coupling element 70 and, via this, the switching elements 65 and 66 can be actuated or switched via the connecting element 74 by means of the actuator 72. The second connecting element 74 is arranged in the axial direction of the electric engine 28 on the side 68 of the electric engine 28 facing away from the planetary gear set 36. Furthermore, the second connecting element 74 is arranged in the axial direction of the electric engine 28 on a side of the fourth switching element 66 facing away from the electric engine 28.

In addition, the electric drive 10 comprises a fifth switching element 76 for non-rotatably coupling a power take-off shaft, not shown in the figures, to the sun gear 38. It can be seen from FIGS. 3 and 4 that the connecting element 74 and, via this, for example, the switching elements 65 and 66, in particular the switching parts 67 and 80 of the switching elements 66 and 65, can be switched or changed over or moved between a third coupling position 3, a fourth coupling position 4 and a second decoupling position 5 by means of the actuator 72.

In the third coupling position, the switching part 67 of the switching element 66 is decoupled from a corresponding switching part 78, which is permanently non-rotatably connected to the housing 12, and the switching part 80 of the switching element 65, which is permanently non-rotatably connected to the sun gear 38, is coupled to the corresponding switching part 63, which is permanently non-rotatably connected to the rotor 32, such that, in the third coupling position, the sun gear 38 is non-rotatably connected to the rotor 32 by means of the switching element 65. This allows the sun gear 38 to rotate around the axis of rotation relative to the housing 12, in particular when the planetary gear set 36 is driven. In the second decoupling position, the switching parts 67 and 80 are decoupled from the respective corresponding switching parts 78 and 63. In the fourth coupling position 4, the switching part 80 of the switching element 65 is decoupled from the corresponding switching part 63, and the switching part 67 of the switching element 66 is coupled to the corresponding switching part 78, such that the sun gear 38 is non-rotatably fixed to the housing 12 by means of the switching element 66. As a result, the sun gear 38 cannot rotate around the axis of rotation relative to the housing 12, in particular when the planetary gear set 36 is driven. Furthermore, the rotor 32 can then rotate around the axis of rotation relative to the sun gear 38.

Advantageously, when the fourth switching element (66) is in the closed state, at least a section of a connecting path, starting from the housing (12), runs via the corresponding switching part (78), then to the switching part (67) and finally to the sun gear (38), radially inside the rotor (32) and axially through the rotor (32). All in all, this results in a particularly compact multi-gear electric drive (10).

Compared to the switching table shown in FIG. 2, the switching table shown in FIG. 4 has additional columns S9, S10 and 511, in which the respective switching positions or switching states are entered. In contrast to the switching table shown in FIG. 2, the switching positions of the connecting element 74 are entered in the column S6, while the switching positions of the connecting element 56 are entered in the column S7, the switching positions of the switching element 66 in the column S8, the switching positions of the switching element 48 in the column S9, the switching positions of the switching element 65 in the column S10, and the switching positions of the switching element 50 in the column S11. As already explained for FIG. 2, 0 in FIG. 4 indicates that the respective switching element 48, 50, 65 or 66 is open or opened. In FIG. 4, X also indicates that the respective switching element 48, 50, 65, or 66 is closed or switched. The switching positions of the connecting element 74 entered in column S6 are the respective coupling positions 3 and 4, while the switching positions of the connecting element 56 entered in the column S7 are the coupling positions 1 and 2. If the first gear G1 is engaged, the switching elements 48 and 66 are opened, while the switching elements 50 and 65 are closed or switched. This means that the switching elements 48 and 66 are in their respective release states, while the switching elements 50 and 65 are in their respective connecting states. The connecting element 56 is in the second coupling position 2, while the connecting element 74 is in the third coupling position 3. The sun gear 38 is the inlet E, while the planetary carrier 40 is the outlet A. The ring gear 42 is non-rotatably fixed to the housing 12.

If the second gear G2 is engaged, the switching elements 48 and 66 are switched or closed, such that they are in their respective connection states. Meanwhile, the switching elements 50 and 65 are open or opened and therefore are in their respective release states. The connecting element 74 is in the fourth coupling position 4, while the connecting element 56 is in the first coupling position 1. The planetary carrier 40 is the outlet A, while the ring gear 72 is the inlet E. The sun gear 38 is fixed non-rotatably to the housing 12 (F). If, on the other hand, the third gear G3 is engaged, the switching elements 48 and 65 are switched or closed, such that they are in their respective connection states. Meanwhile, the switching elements 50 and 66 are open or opened and are therefore in their respective release states. The connecting element 56 is in the first coupling position 1, while the connecting element 74 is in the third coupling position 3. Here, the sun gear 38 and the ring gear 42 are respective inlets E, while the planetary carrier 40 is the outlet A.

The second embodiment solves in particular the technical problem of fixing the sun gear 38 to the housing 12 in a space-efficient manner. Usually, there is no access to the sun inside the electric drive 10. In order to non-rotatably fix the sun to the housing 12 in a particularly advantageous manner, the sun can be fixed through the hollow shaft by means of the solid shaft, also referred to as a torsion bar or designed as a torsion bar, i.e. non-rotatably fixed to the housing 12. As a result, a particularly efficient and thus energy-saving operation can be implemented. In addition, with the second embodiment, it is possible to couple at least one or more power take-offs to the electric engine 28 via the switching element 76 and thus drive it.

In the following, an operation of the electric drive 10 is described. In order to switch from the first gear G1 to the second gear G2, the electric engine 28 is switched without torque. Then the connecting element 56 is switched from the coupling position 2 to the decoupling position 0, whereby the switching element 50 is opened. Synchronization then takes place by means of the electric engine 28, until a synchronism is achieved in or at the switching element 48. Then the connecting element 56 is moved from the decoupling position 0 to the coupling position 1, whereby the switching element 48 is closed. Then the connecting element 74 is switched from the coupling position 3 to the decoupling position 5, whereby the switching element 65 is opened. Synchronization then takes place by means of the electric engine 28 until the solid shaft is stationary. Then the coupling element 74 is switched from the decoupling position 5 to the coupling position 4, whereby the switching element 66 is closed.

When switching from the second gear G2 to the third gear G3, the electric engine 28 is switched without torque. The connecting element 74 is switched from the coupling position 4 to the decoupling position 5, whereby the switching element 66 is opened. Synchronization takes place by means of the electric engine 28, until synchronism is achieved at the switching element 65. Then the connecting element 74 is switched from the decoupling position 5 to the coupling position 3, whereby the switching element 65 is closed.

When switching from the third gear G3 to the second gear G2, the electric engine 28 is switched without torque. Then the connecting element 74 is switched from the coupling position 3 to the decoupling position 5, whereby the switching element 65 is opened. Synchronization takes place by means of the electric engine 28, until the solid shaft is stationary. Then the connecting element 74 is switched from the decoupling position 5 to the coupling position 4, whereby the switching element 66 is closed. When switching from the gear G2 to the gear C1, the electric engine 28 is switched without torque. Then the connecting element 74 is switched from the coupling position 4 to the decoupling position 5, whereby the switching element 66 is opened. Synchronization takes place by means of the electric engine 28, until synchronism is achieved at or in the switching element 65. Then the connecting element 74 is switched from the decoupling position 5 to the coupling position 3, whereby the switching element 65 is closed. Furthermore, the connecting element 56 is switched from the coupling position 1 to the decoupling position 0, whereby the switching element 48 is opened. Synchronization takes place by means of the electric engine 28, until the ring gear 42 is stationary. Then the connecting element 56 is switched from the decoupling position 0 to the coupling position 2, whereby the switching element 50 is closed.

When switching from the gear G1 to the gear G3, the electric engine 28 is switched without torque. Then the connecting element 56 is switched from the coupling position 2 to the decoupling position 0, whereby the switching element 50 is opened. Synchronization takes place by means of the electric engine 28, until synchronism is achieved in or at the switching element 48. Then the connecting element 56 is switched from the decoupling position 0 to the coupling position 1, whereby the switching element 48 is closed.

When switching from the gear G3 to the gear C1, the electric engine 28 is switched without torque. Then the connecting element 56 is moved from the coupling position 1 to the decoupling position 0, whereby the switching element 48 is opened. Synchronization takes place by means of the electric engine 28, until the ring gear 42 is stationary. Then the connecting element 56 is switched from the decoupling position 0 to the coupling position 2, whereby the switching element 50 is closed. The switch from the gear G1 to the gear G2 is therefore a sequence of switches from the gear G1 to the gear G3 and from the gear G3 to the gear G2. Conversely, the switch from the gear G2 to the gear G1 is a sequence of switches from the gear G2 to the gear G3 and from the gear G3 to the gear C1.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

REFERENCE NUMERAL LIST 10 electric drive
12 housing
14 housing part
16 housing part
18 parting plane
20 connecting element
22 flange
24 flange
26 output shaft
28 electric engine
30 stator
32 rotor
34 machine axis of rotation
36 planetary gear set
38 sun gear
40 planetary carrier
42 ring gear
44 main axis of rotation
46 planetary gear
48 switching element
49 switching part
50 switching element
51 switching part
52 coupling element
54 actuator
56 connecting element
58 side
60 switching part
62 switching part
63 switching part
64 coupling element
65 switching element
66 switching element
67 switching part
68 side
70 coupling element
72 actuator
74 connecting element
76 switching element
78 switching part
80 switching part
0 decoupling position
1 coupling position
2 coupling position
3 coupling position
4 coupling position
5 decoupling position
i transmission ratio
G1 first gear
G2 second gear
G3 third gear
S1 column
S2 column
S3 column
S4 column
S5 column
S6 column
S7 column
S8 column
S9 column
S10 column
S11 column
o open
x closed
A outlet
E inlet
F fix

The invention claimed is:

1. An electric drive for a motor vehicle, the electric drive comprising:
a housing;
an output shaft;
an electric engine, which has a stator and a rotor rotatable relative to the stator;
a planetary gear set arranged in the housing, wherein the planetary gear set has a sun gear, a ring gear and a planetary carrier, which is non-rotatably connected to the output shaft;
a first switching element configured to non-rotatably couple the ring gear to the rotor;
a second switching element configured to non-rotatably couple the ring gear to the housing;
a third switching element configured to non-rotatably couple the sun gear to the rotor; and
a fourth switching element configured to non-rotatably couple the sun gear to the housing, the fourth switching element is arranged on a side of the electric engine facing away from the planetary gear set in an axial direction of the electric engine, and
wherein the first switching element and the second switching element are coupled to each other via a first coupling element and can thereby be actuated together by a single first actuator common to the first switching element and the second switching element.

2. The electric drive of claim 1, wherein the first coupling element has the ring gear, which is a displacement ring gear displaceable relative to the housing in an axial direction of the planetary gear set, wherein the displacement ring gear is displaceable in the axial direction relative to the housing for joint actuation of the first switching element and the second switching element.

3. The electric drive of claim 1, wherein the first coupling element is connected to the first actuator via a first connecting element, which is arranged in an axial direction of the planetary gear set on a side of the planetary gear set facing away from the electric engine.

4. The electric drive of claim 1, further comprising:
a second coupling element, which is a hollow shaft, via which the third switching element is coupled to the rotor.

5. The electric drive of claim 4, wherein the fourth switching element is arranged on a side of the third switching element facing away from the planetary gear set in an axial direction of the planetary gear set.

6. The electric drive of claim 4, further comprising:
a third coupling element, which is a hollow shaft, via which the fourth switching element is coupled to the sun gear, wherein the third coupling element is arranged at least partially radially inside the second coupling element.

7. The electric drive of claim 6, wherein the fourth switching element and the third switching element are coupled to each other via the third coupling element and can thus be operated jointly by a single second actuator common to the third switching element and the fourth switching element.

8. The electric drive of claim 7, further comprising:
a second connecting element configured to connect the third coupling element to the second actuator, wherein the second connecting element is arranged in the axial direction of the electric engine on a side of the electric engine facing away from the planetary gear set.

9. The electric drive of claim 8, wherein the second connecting element is arranged in the axial direction of the electric engine on a side of the fourth switching element facing away from the electric engine.

10. The electric drive of claim 1, further comprising:
a fifth switching element configured to non-rotatably couple a power take-off shaft to the sun gear.

11. The electric drive of claim 10, wherein the fifth switching element is arranged in the axial direction of the electric engine on a side of the fourth switching element facing away from the electric engine.

12. The electric drive of claim 1, wherein
the fourth switching element has a switching part permanently non-rotatably connected to the sun gear and a corresponding switching part permanently non-rotatably connected to the housing, and
in a closed state of the fourth switching element, at least a section of a connecting path running from the housing via the corresponding switching part, further to the switching part and finally to the sun gear, runs radially inside the rotor and axially through the rotor.

* * * * *